US011958303B2

(12) United States Patent
Ohashi et al.

(10) Patent No.: US 11,958,303 B2
(45) Date of Patent: Apr. 16, 2024

(54) HANDHELD PRINTING APPARATUS

(71) Applicant: CANON KABUSHIKI KAISHA, Tokyo (JP)

(72) Inventors: Tetsuyo Ohashi, Tokyo (JP); Hiroshi Nakai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/874,408

(22) Filed: Jul. 27, 2022

(65) Prior Publication Data

US 2023/0034416 A1 Feb. 2, 2023

(30) Foreign Application Priority Data

Jul. 30, 2021 (JP) ................................ 2021-125322

(51) Int. Cl.
*B41J 3/36* (2006.01)
*B41J 29/393* (2006.01)

(52) U.S. Cl.
CPC .............. *B41J 29/393* (2013.01); *B41J 3/36* (2013.01)

(58) Field of Classification Search
CPC ........................................................ B41J 3/36
See application file for complete search history.

(56) References Cited

U.S. PATENT DOCUMENTS 5,512,926 A 4/1996 Uchikata et al.
5,534,899 A 7/1996 Uchikata et al.
5,917,518 A 6/1999 Ohashi et al.
6,003,985 A 12/1999 Bekki
6,012,810 A 1/2000 Ohashi
6,022,091 A 2/2000 Uchikata et al.
6,050,673 A 4/2000 Wada et al.
6,070,975 A 6/2000 Uchikata et al.
6,129,461 A 10/2000 Nakai
6,341,844 B1 1/2002 Uchikata et al.

(Continued)

FOREIGN PATENT DOCUMENTS

JP 4366088 B2 * 11/2009 .............. B41J 11/42
JP 2019-001055 A 1/2019

(Continued)

OTHER PUBLICATIONS

Nakagawa, MachineTranslationofJP-2020055260-A, 2020 (Year: 2020).*

(Continued)

*Primary Examiner* — Scott A Richmond
(74) *Attorney, Agent, or Firm* — Venable LLP

(57) ABSTRACT

Provided is a printing apparatus including: a guide unit configured to guide movement, in a first direction, of the printing apparatus held and moved by a user; a printing unit configured to print an image onto a print medium with the movement in the first direction; a second guide unit configured to guide movement of the printing apparatus in a second direction crossing the first direction; a detection unit configured to detect a relative moving amount between the printing apparatus and the print medium; and a control unit configured to cause a notification unit to make a predetermined notification according to a first distance in the first direction between the printing unit and the detection unit and a position at which an operation of printing a single line by the printing unit is completed.

9 Claims, 11 Drawing Sheets

(56) References Cited

U.S. PATENT DOCUMENTS

| | | | |
|---|---|---|---|
| 6,523,933 | B1 | 2/2003 | Hirano et al. |
| 6,796,648 | B2 | 9/2004 | Ohashi |
| 6,890,072 | B2 | 5/2005 | Ohashi |
| 6,912,063 | B1 | 6/2005 | Yamamoto et al. |
| 7,114,867 | B2 | 10/2006 | Ohashi et al. |
| 7,187,901 | B2 | 3/2007 | Ohashi |
| 8,146,529 | B2 | 4/2012 | Hakamata et al. |
| 8,220,411 | B2 | 7/2012 | Yoshino et al. |
| 8,789,491 | B2 | 7/2014 | Nagahara et al. |
| 9,259,937 | B2 | 2/2016 | Taniguchi et al. |
| 9,272,543 | B2 | 3/2016 | Ohyama et al. |
| 10,406,838 | B2 | 9/2019 | Ohashi et al. |
| 10,723,153 | B2 | 7/2020 | Ohashi et al. |
| 10,894,416 | B2 | 1/2021 | Nakai et al. |
| 10,974,527 | B2 | 4/2021 | Ohashi et al. |
| 2020/0316967 | A1 | 10/2020 | Ohashi et al. |

FOREIGN PATENT DOCUMENTS

| | | | | | |
|---|---|---|---|---|---|
| JP | 2020055260 | A | * | 4/2020 | |
| WO | WO-2018088594 | A1 | * | 5/2018 | ............. A45D 34/04 |

OTHER PUBLICATIONS

Lee, MachineTranslationofWO-2018088594-A1, 2018 (Year: 2018).*
Ushigome, MachineTranslationofJP-4366088-B2, 2009 (Year: 2009).*

* cited by examiner

PRINTING

LINE BREAK STARTS

LINE BREAK ENDS

PRINTING

LINE BREAK STARTS

HANDHELD PRINTING APPARATUS

BACKGROUND OF THE INVENTION

Field of the Invention

The present invention relates to a handheld printing apparatus for performing printing by having an operator manually scan its body.

Description of the Related Art

A handheld printing apparatus for performing printing by having an operator manually scan its body has been known. The handheld printing apparatus disclosed in Japanese Patent Laid-open No. 2019-1055 is such that an operator visually determines that printing of a single line has been completed, stops manual scanning of the printing apparatus, and performs a line break operation.

Here, there is a case where the body of such a printing apparatus has a certain width and a part that performs an actual printing operation such as ink ejection is present around the center of the body of the printing apparatus. In this case, a printed area immediately after being printed is hidden by the body of the printing apparatus and is therefore not visible. Thus, in order to confirm the completion of an operation of printing a single line, the operator needs to continue moving the printing apparatus farther even after the printing is finished.

SUMMARY OF THE INVENTION

A printing apparatus according to one aspect of the present invention is a printing apparatus including a guide unit configured to guide movement, in a first direction, of the printing apparatus held and moved by a user; a printing unit configured to print an image onto a print medium with the movement in the first direction; a second guide unit configured to guide movement of the printing apparatus in a second direction crossing the first direction; a detection unit configured to detect a relative moving amount between the printing apparatus and the print medium; and a control unit configured to cause a notification unit to make a predetermined notification according to a first distance in the first direction between the printing unit and the detection unit and a position at which an operation of printing a single line by the printing unit is completed.

Further features of the present invention will become apparent from the following description of exemplary embodiments with reference to the attached drawings.

DESCRIPTION OF THE EMBODIMENTS

First Embodiment

A first embodiment of the present invention will be described below with reference to drawings.

Note that the term "print" herein is not limited to formation of information with a meaning such as characters or a figure, and includes formation of information with a meaning and also information without a meaning. Moreover, the term is not limited by whether what is to be "printed" is elicited so as to be visually perceptible to humans, and represents a wide range of meanings such as formation of an image, a design, a pattern, or the like on a print medium and processing a print medium.

Also, the term "ink" (also referred to as "liquid") is to be widely interpreted as with the definitions of "print" mentioned above. Thus, the term represents a liquid to be used to form an image, a design, a pattern, or the like or process a print medium by being applied to a print medium, or to process an ink (e.g., solidification or insolubilization of a colorant in an ink to be applied to a print medium).

"Print medium" is mainly a medium such as a paper sheet or note, but is not particularly limited to these as long as it is a medium on which printing can be performed by attaching an ink. "Print medium" may be any material as long as it accepts an ink, such as fabric, plastic film, sheet metal, glass, ceramic, wood, or leather.

Figure 1A:
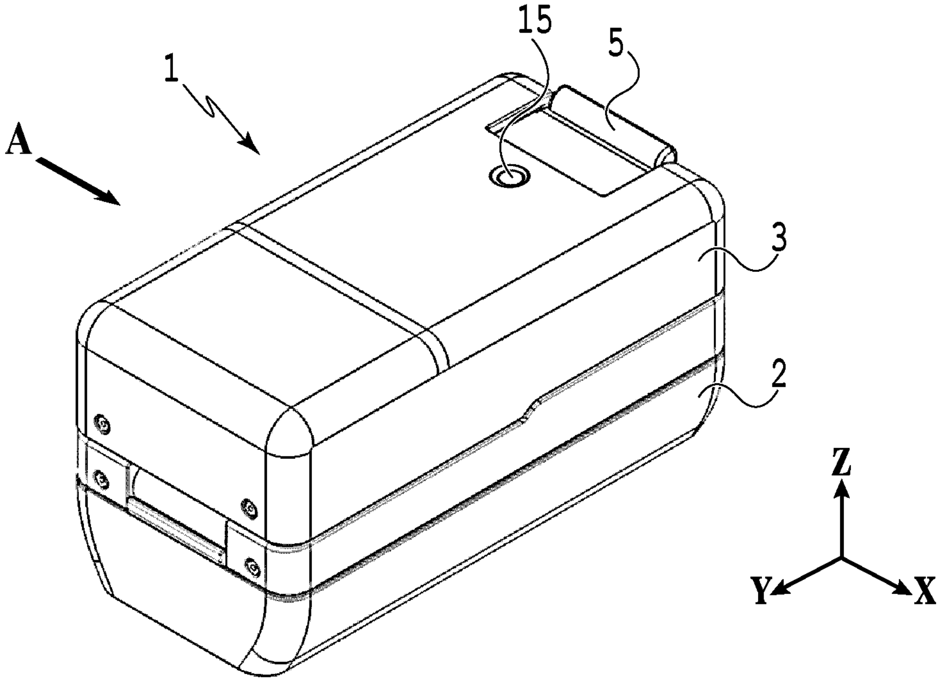
FIGS. 1A and 1B are perspective views illustrating a manually scanned handheld printing apparatus.
Figure 1B:
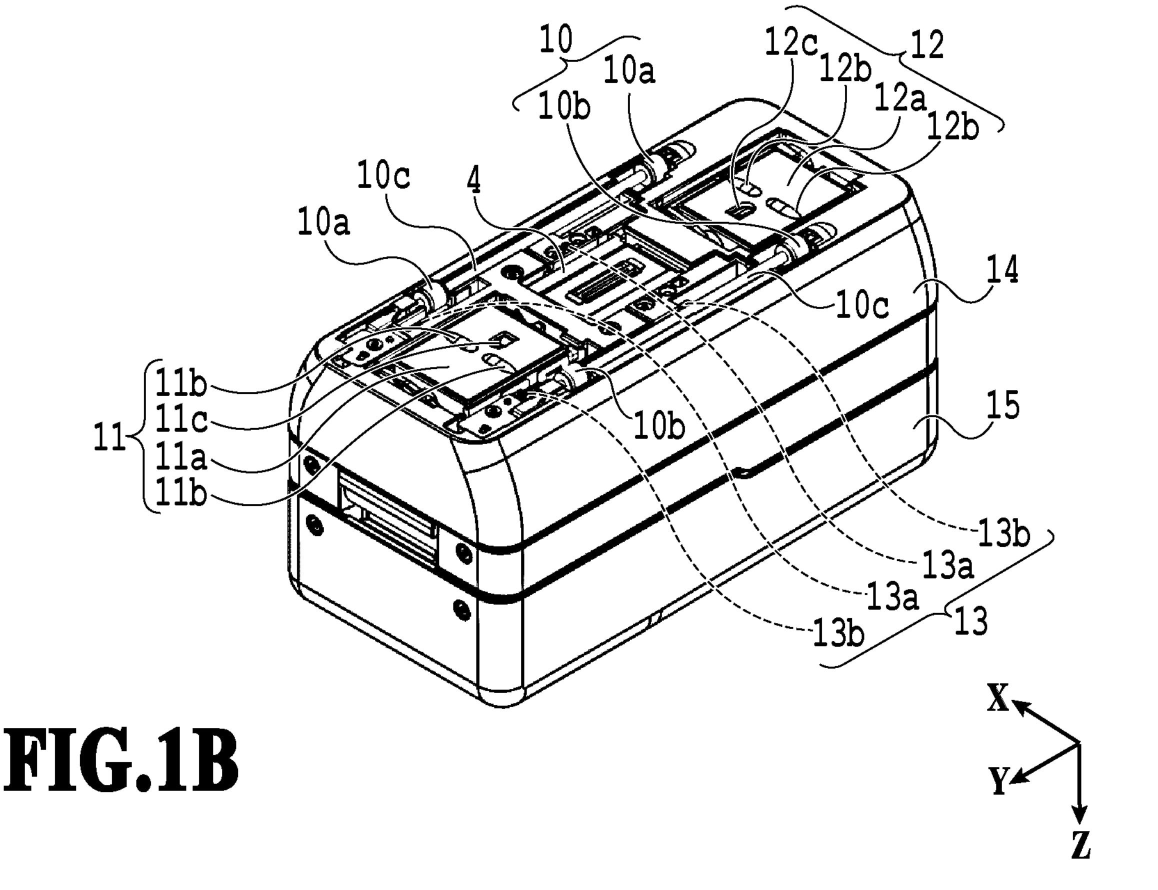

FIGS. 1A and 1B are perspective views illustrating a manually scanned handheld printing apparatus (hereinafter also referred to simply as "printing apparatus") 1 in the present embodiment. FIG. 1A is a view illustrating the top side of the manually scanned handheld printing apparatus 1, while FIG. 1B is a view illustrating the bottom side of the manually scanned the handheld printing apparatus 1. The printing apparatus 1 includes an upper unit 3 mainly containing a control unit's components, a lower unit 2 including a print head 4 and guide rollers 10, and a line break handle 5 to be operated by an operator in a case of performing a line break operation. On the upper unit 3, an LED 15 is disposed in addition to the line break handle 5. The print head 4 performs printing by ejecting an ink onto a print medium with movement of the printing apparatus 1.

A plurality of guide rollers 10 are provided. In the present embodiment, these are a paired right guide roller 10*a* and left guide roller 10*b* which guide movement of the printing apparatus 1 in ±X directions (first direction) while pressing a print medium P during a printing operation.

Figure 5A:
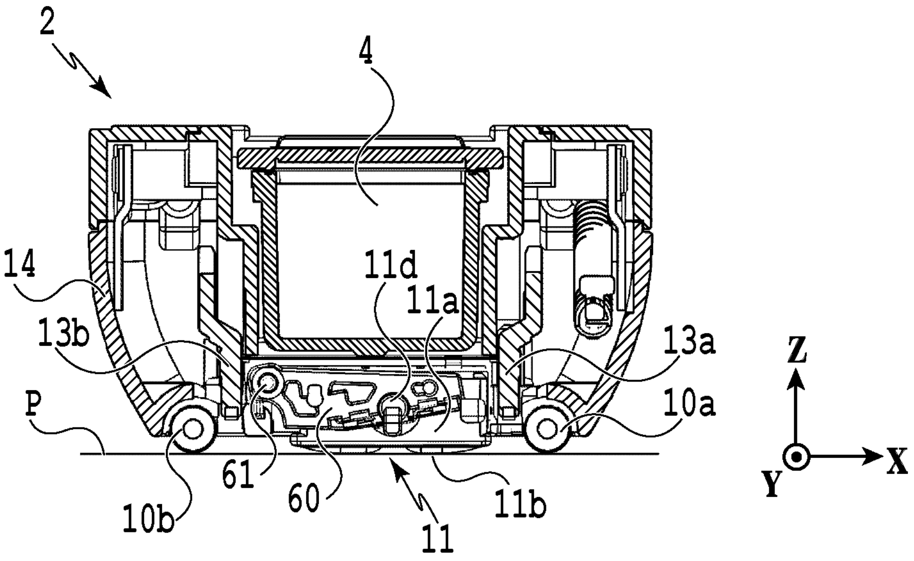
FIGS. 5A and 5B are views illustrating a downstream position detection sensor and components around it.
Figure 5B:
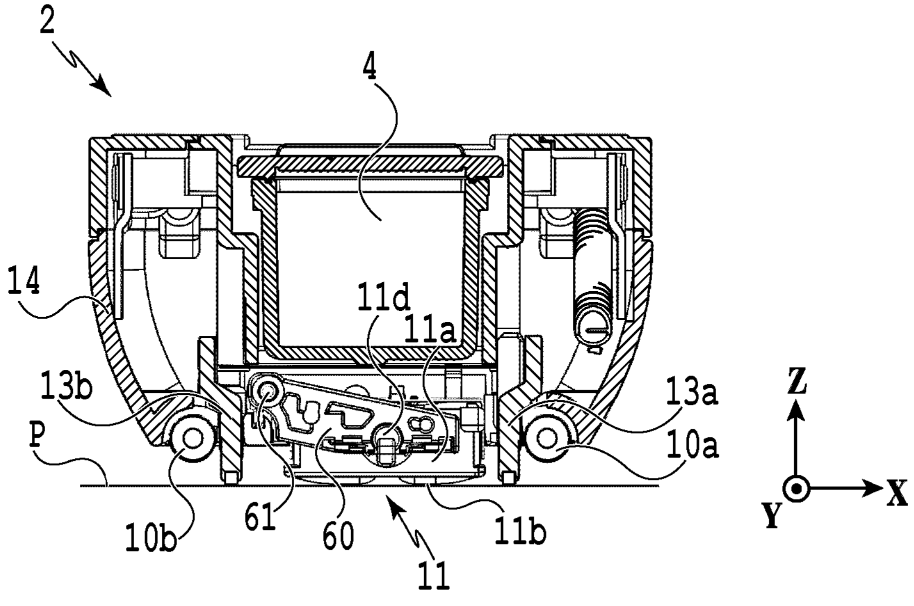
Figure 6A:
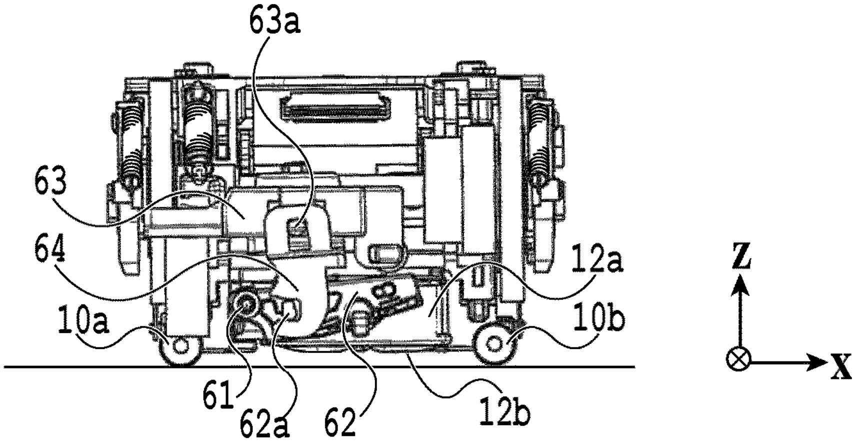
FIGS. 6A to 6C are views illustrating an upstream position detection sensor and components around it.
Figure 6B:
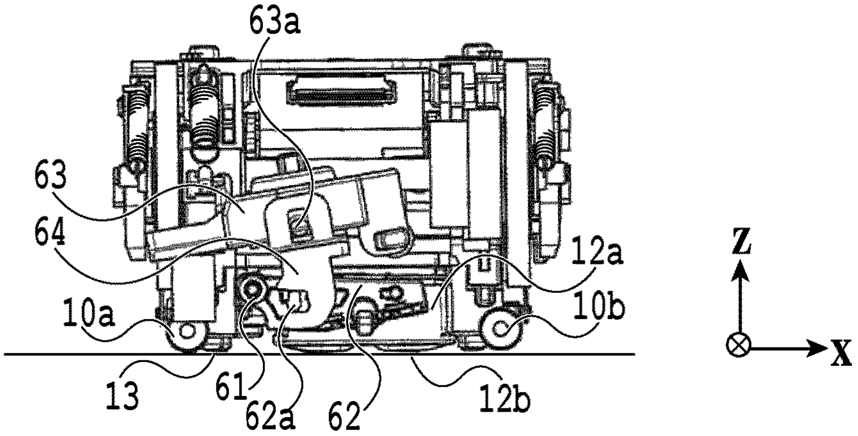

The lower unit 2 is provided with a downstream position detection sensor 11 and an upstream position detection sensor 12 with the print head 4 therebetween. The downstream position detection sensor 11 and the upstream position detection sensor 12 are provided to be capable of contacting the print medium. Relative to the print head 4, the downstream position detection sensor 11 is situated on a side in the traveling direction in a line break operation after printing a single line (i.e., in the moving direction for line break), and detects the relative moving amount between the printing apparatus 1 and the print medium. The upstream position detection sensor 12 is situated on the opposite side of the print head 4 in the traveling direction in a line break operation, and detects the moving amount of the printing apparatus body. In the present embodiment, as will be described later, a line break operation of the printing apparatus 1 is an operation of moving in a +Y direction (second direction). Thus, the +Y side will be referred to as the downstream side in the traveling direction for line break (new line side), while the —Y side will be referred to as the upstream side in the moving direction for line break (previous line side). The downstream position detection sensor 11 includes a downstream position detection sensor case 11*a*, sensor case sliders 11*b*, a sensor lens 11*c*, and a Y-direction sensor support shaft 11*d* (FIGS. 5A and 5B). The upstream position detection sensor 12 includes an upstream position detection sensor case 12*a*, sensor case sliders 12*b*, a sensor lens 12*c*, and a Y-direction sensor support shaft 12*d* (FIGS. 6A and 6B). The lower unit 2 is further provided with line break legs 13. The line break legs 13 are members that separate the guide rollers 10 from the print medium and move the printing apparatus body during a line break operation, and include a pair of right line break legs 13*a* and a pair of left line break legs 13*b*. During a line break operation, the two right line break legs 13*a* and the two left line break legs 13*b* contact the printing surface of the print medium.

The right guide roller 10*a* and the left guide roller 10*b* are each formed as an integrated component with one shaft 10*c* and two rollers fixed to this shaft 10*c*. The two rollers are provided coaxially with each other. The shafts 10*c* of the right guide roller 10*a* and the left guide roller 10*b* are provided substantially parallel to each other, and are supported by the lower unit case 14 so as to allow the shafts 10*c* to turn while reducing their backlashes in the thrust direction. Each roller's cylindrical surface that contacts the print medium P is preferably subjected to a process such as sticking fine abrasive grains to increase the coefficient of friction with the print medium P, and the two rollers are preferably given substantially the same diameter to achieve good straightness of travel. For the straightness of travel, it is also preferable to support the right guide roller 10*a* and the left guide roller 10*b* in parallel to each other. During movement on the print medium P, configurations as above enable the guide rollers 10 to passively roll without slipping, and also improve the straightness of travel of the printing apparatus 1.

These mechanisms serve as a base of the lower unit 2 and housed in the lower unit case 14, in which the print head 4, the guide rollers 10, and so on are disposed.

FIGS. 2A to 2D are views illustrating a printing operation of the printing apparatus 1 on the print medium P in a step-by-step manner. In FIGS. 2A to 2D, areas PA represent printed areas where images are printed. A case of printing a first single line from the left side of the print medium P toward its right side will be described below. Note that it is also possible to perform the first printing from the right side of the print medium P toward its left side.

Figure 2A:
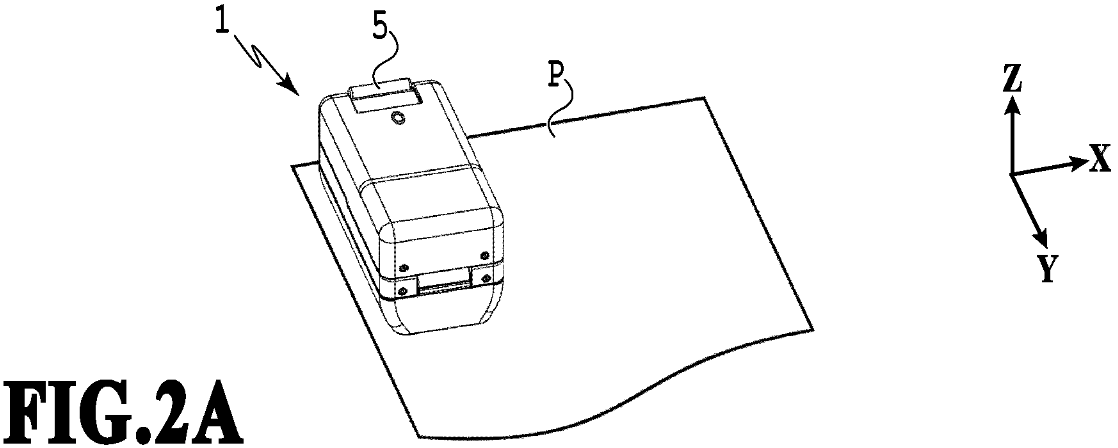
FIGS. 2A to 2D are views illustrating a printing operation of the printing apparatus on a print medium in a step-by-step manner.

When starting the printing, the printing apparatus is positioned at an upper left portion of the print medium P, as illustrated in FIG. 2A. In this state, of the components of the printing apparatus 1, the four rollers 10*a* and 10*b* of the guide rollers 10 and the sensor case sliders 11*b*, which are part of the downstream position detection sensor 11, are in contact with the print medium P, whereas the upstream position detection sensor 12 is not in contact with the print medium P. The upstream position detection sensor 12 is not in contact with the print medium P during the printing operation in order to avoid rubbing the printed area after the later-described line break operation is performed. Specifically, as the printing apparatus 1 performs a line break operation, the position of the printed area and the contact position of the upstream position detection sensor 12 on the print medium P move relative to each other in the moving direction for line break. Thus, in the course of repeating line break operations, the contact position of the upstream position detection sensor 12 on the print medium P may overlap the printed area in the moving direction for line break in some cases. If the printing apparatus 1 is scanned for printing in this state, the sensor case sliders 12*b* of the upstream position detection sensor 12 will be rubbed against the printed area. An inkjet print head is used as the print head 4 in the present embodiment. If an ink yet to be fixed is remaining on the printed area, there is a possibility that the sensor case sliders 12*b* sliding over the ink scrape and detach the ink and transfer the ink onto another area, thereby causing soiling. Thus, in the present embodiment, the upstream position detection sensor 12 is controlled to be separated from (out of contact with) the print medium P during printing operations. Note that, as illustrated in FIG. 1B, the rollers 10*a* and 10*b* of the guide rollers 10 on the upstream side in the moving direction for line break (—Y side) are positioned closer to the print head 4 than the sensor case sliders 12*b* are. Nonetheless, since the rollers 10*a* and 10*b* make rotational motions on the print medium P, moving them on the printed area does not deteriorate the printing quality, as compared to the sliding movement of the sensor case sliders 12*b*.

Figure 2B:
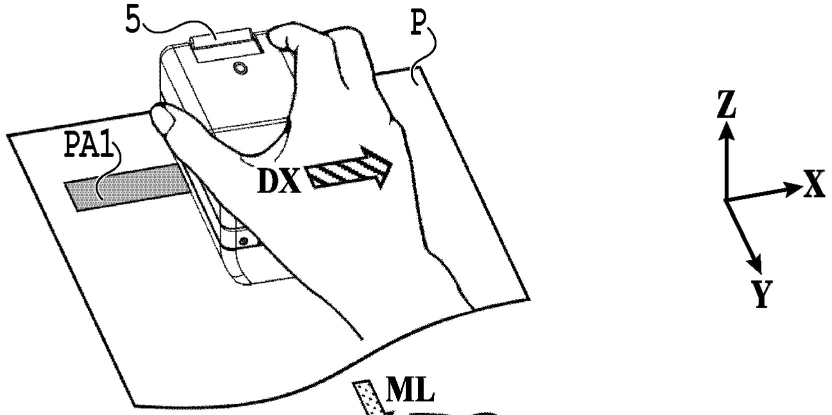

Thereafter, in FIG. 2B, the operator places a hand on the printing apparatus 1 and moves the printing apparatus 1 in the moving direction for printing (the direction of the arrow DX). When the printing apparatus 1 starts moving, the downstream position detection sensor 11 detects the moving amount.

In the present embodiment, while the printing apparatus 1 is moved in the moving direction for printing by the operator's operation, the downstream position detection sensor 11 is used to detect the moving amount. Also, while the printing apparatus 1 is moved in a line break direction by a line break operation by the later-described line break mechanism, the downstream position detection sensor 11 and the upstream position detection sensor 12 are used to detect the moving amount. An example of the detection of the moving amount by the two detection sensors is described below. The downstream position detection sensor 11 and the upstream position detection sensor 12 optically read characteristics of the surface of the print medium P, detect the moving amount from the movement start position, and integrate this moving amount to thereby calculate the current position of the printing apparatus 1. In the present embodiment, sensors of types capable of accurately detecting moving amount are used, and the working distance between the sensors and the print medium P needs to be 2.4 mm with the distance tolerance range kept within ±0.3 mm. A printing operation is performed by detecting the relative moving amount between the printing apparatus 1 and the print medium P with sensors as above and ejecting the ink from the print head 4 according to the moving amount of the printing apparatus 1. Note that the detection method of the downstream position detection sensor 11 and the upstream position detection sensor 12 is not limited to the above method, and may be any method as long as it can detect the relative positions of the printing apparatus 1 and the print medium P.

Figure 3:
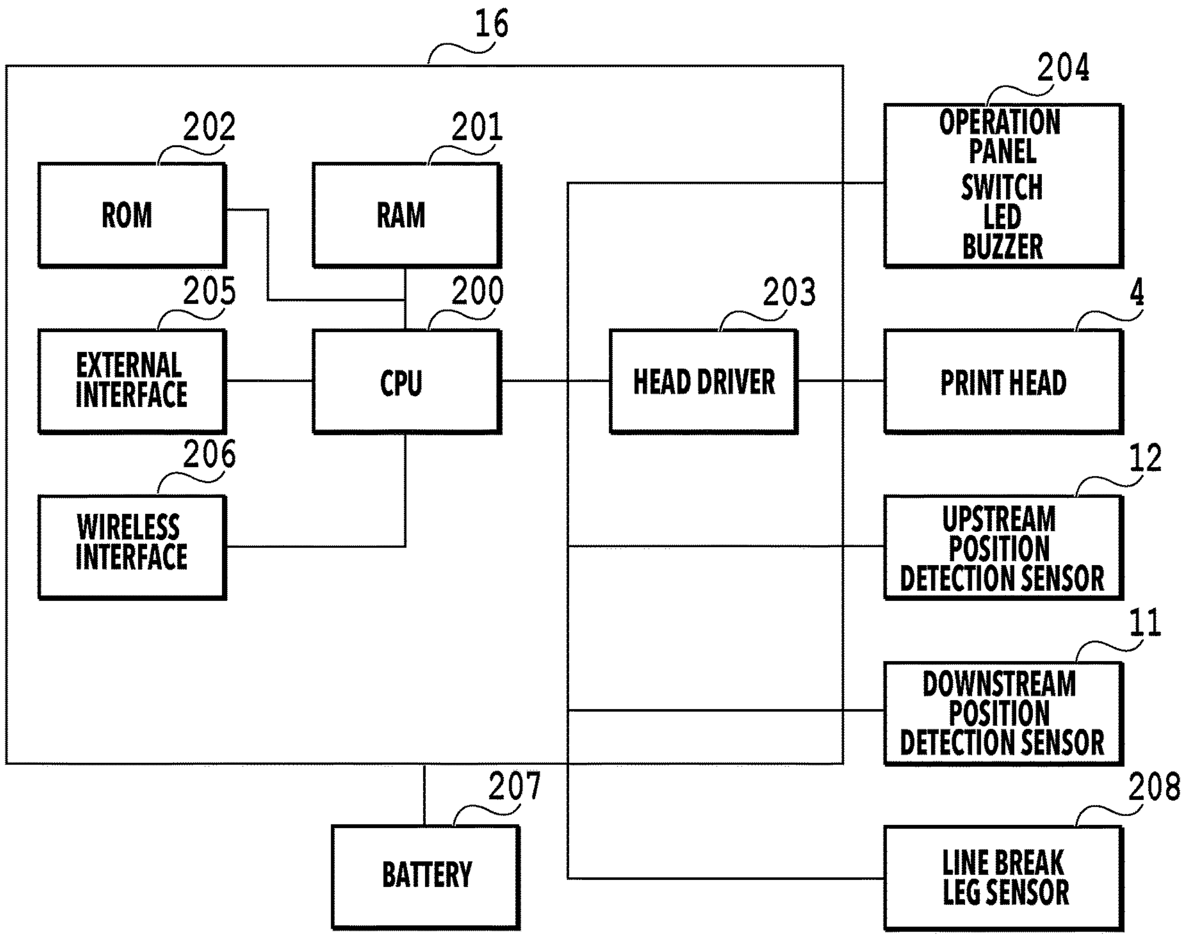
FIG. 3 is a block diagram illustrating a configuration of a control unit in the printing apparatus.

Now, a configuration of a control unit 16 in the printing apparatus 1 will be described. FIG. 3 is a block diagram illustrating a configuration of the control unit 16 in the printing apparatus 1. The control unit 16 includes a CPU 200, a RAM 201, a ROM 202, a head driver 203, an external interface 205, and a wireless interface 206. Moreover, the control unit 16 is connected to an operation panel 204, the print head 4, the upstream position detection sensor 12, the downstream position detection sensor 11, a battery 207, and a line break leg sensor 208. The CPU 200 is responsible for performing data processing, obtaining sensor information, and controlling the driving of the print head. The RAM 201 is responsible for temporarily storing programs and image data to be printed and the like. The ROM 202 stores programs and various setting values. The head driver 203 is responsible for control for ejecting the ink from the nozzles in the print head 4.

The operation panel 204 is provided in the printing apparatus 1 and includes various switches, a display unit such as an LED display, a buzzer, and so on. The external interface 205 is responsible for data exchange with an external control apparatus and the like. The wireless interface 206 wirelessly controls the printing apparatus 1 in place of the external interface 205. The battery 207 is used to drive the printing apparatus 1 in a cordless manner. The line break leg sensor 208 detects the operation of the line break legs 13 to be described later. The ink ejection of the print head 4 is controlled by these components of the control unit 16. Specifically, before the start of a printing operation, at least print data necessary for printing a single line is received via the wireless interface 206 or the external interface 205, and this print data is stored in the RAM 201. After various print settings are determined and the printing operation becomes ready to be started, the operator is notified via the operation panel 204 that the printing operation can be started.

The print head 4 employs an inkjet method by which it ejects the ink from a plurality of minute nozzles arranged substantially straight in a direction crossing the moving direction for printing. Thus, an image is formed by reading data out of the RAM 201 according to the result of the moving amount detection by the downstream position detection sensor 11 and causing the CPU 200 to determine the timing and the data to be printed at the corresponding position, and ejecting the ink from the print head 4 as appropriate. At this time, the printing apparatus 1 is manually scanned by the operator. The moving speed is therefore not guaranteed to be constant, and the speed is expected to vary. Control is performed such that the image will be printed as indicated by the original data on the print medium P even with such speed variation. By continuously performing this process, the operation of printing a single line is completed. After the completion of the single-line printing operation, the operator is notified of the completion of the single-line printing operation via the operation panel 204, and stops the scanning operation in the moving direction for printing DX.

Figure 2C:
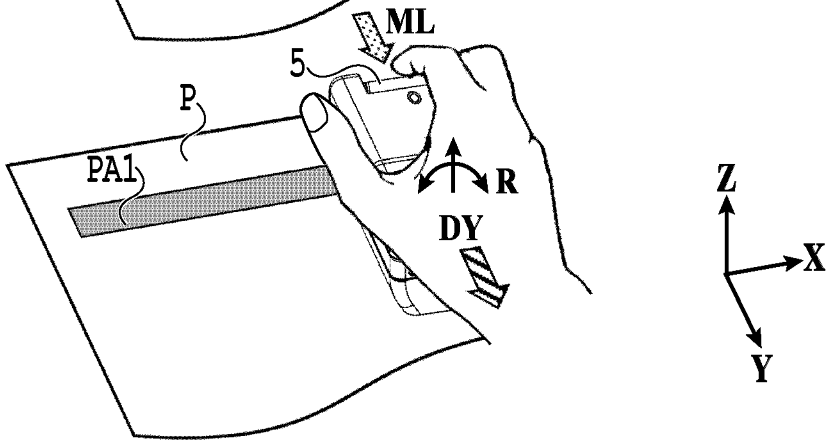

In FIG. 2C, a line break operation is performed by the operator's operation. The line break operation is an operation performed for the purpose of applying an effect equivalent to a so-called line feed operation involving conveying a sheet by a predetermined distance after a single-line printing operation of the carriage in a general serial scan-type printer. Specifically, the line break operation is an operation of moving the print head 4 in the moving direction for line break (the direction of the arrow DY), which is substantially orthogonal to the moving direction for printing (the direction of the arrow DX), to a position from which to perform the next single-line printing operation according to the position, on the print medium P, of a printed area PA1 completed by the single-line printing operation.

While details of the line break operation will be described later, the operator's operation involves moving the line break handle 5 in a lever operating direction for line break (the direction of the arrow ML). In conjunction with the line break operation triggered by this operator's operation, the line break legs 13 act so as to move the printing apparatus 1 a predetermined distance in the moving direction for line break (the direction of the arrow DY). Note that the printing apparatus 1 includes a mechanism that brings not only the downstream position detection sensor 11 but also the upstream position detection sensor 12 into contact with the print medium P during a line break movement. The moving amount of the printing apparatus 1 may vary, and the printing apparatus 1 may rotate in the plane of the print medium P (in the direction of the arrow R in FIG. 2C) before or after the line break movement. In this case, by detecting the state of the line break movement of the printing apparatus 1 with the plurality of position detection sensors, it is possible to detect the amounts of the variation and the rotation. Note that the upstream position detection sensor 12 is configured to be separated from the print medium P again when the line break movement is finished. The line break operation is now completed.

Figure 2D:
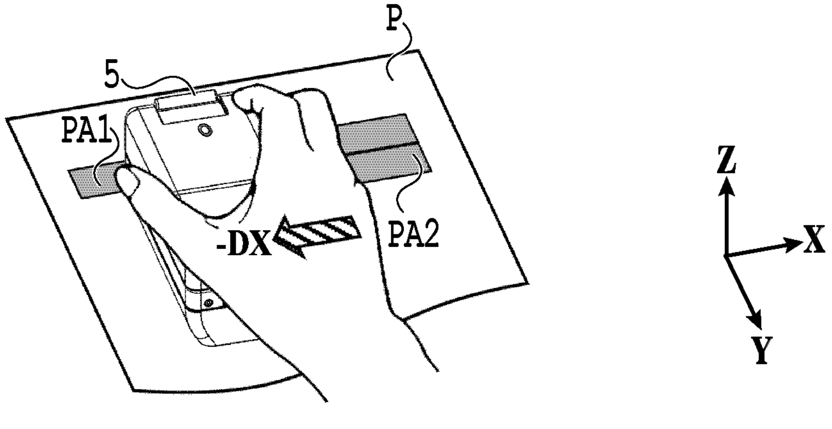

Thereafter, in FIG. 2D, a printing operation is performed for the second line. The printing operation of the second line is prepared by preparing image data by a process similar to that for the printing operation of the first line and, if the moving amount varied during the line break operation, correcting the variation. The operator performs a basic operation similar to that for the first line. Here, by preparing print data during the line break operation, the printing operation will be basically ready to be performed after the line break operation. In this way, the operator can immediately start the second scan. Since the scanning direction for the second line is the reverse of the scanning direction for the first line, the operator moves the printing apparatus 1 in the direction of the arrow −DX.

The image of the second line is formed in a similar manner to the scan for the first line by detecting the moving amount with the downstream position detection sensor 11 and ejecting the ink from the print head 4 according to the position. By performing appropriate correction, images can be formed in a unified manner in the printed area PA1 of the first line and a printed area PA2 of the second line with almost no misalignment. Note that description of the method of the correction is omitted since it is not the subject matter of the present embodiment. If necessary, the operator continuously performs a printing operation in a similar manner for the third line, the fourth line, and so on to complete forming the desired image.

FIGS. 4A to 4H are views illustrating the line break mechanism in the printing apparatus 1 along the flow of a line break operation. The line break mechanism in the printing apparatus 1 includes a line break lever 50, a line break mechanism drive gear train 51, a drive gear train reset lever 52, a drive gear train reset sub lever 53, and a drive gear train reset cam 54. The line break lever 50 operates in conjunction with the line break handle 5. The line break mechanism drive gear train 51 is driven in response to the operation of the line break lever 50, and causes the line break legs 13 to operate. The line break legs 13 are rotationally moved in the clockwise direction in FIGS. 4A to 4H by the line break mechanism drive gear train 51. When the line break legs 13 come into contact with the print medium P, the line break legs 13 serve as fixed base points on the print medium P, about which the printing apparatus 1 rotationally moves in the clockwise direction in FIGS. 4A to 4H.

The drive gear train reset lever 52 brings the line break mechanism drive gear train 51 back to its initial state. The drive gear train reset sub lever 53 operates in the last half of the operation of bringing the line break mechanism drive gear train 51 back to its initial state. The drive gear train reset cam 54 receives force from the drive gear train reset lever 52 and the drive gear train reset sub lever 53. The drive gear train reset cam 54, which is on the line break mechanism drive gear train 51, is provided integrally with one of the gears of the line break mechanism drive gear train 51, and rotates in the counterclockwise direction in FIGS. 4A to 4H in response to the operation on the line break lever 50. Also, gears coupled to both sides of both sides of a gear integrally provided to the drive gear train reset cam 54 rotate in the clockwise direction in FIGS. 4A to 4H in response to the operation of the line break lever 50. The line break legs 13 make the clockwise rotational movement in synchronization with this rotation.

Figure 4A:
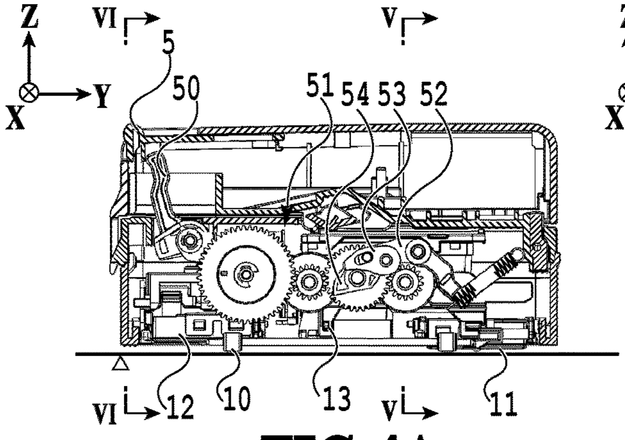
FIGS. 4A to 4H are views illustrating a line break mechanism in the printing apparatus along the flow of a line break operation.

FIG. 4A illustrates a normal standby state and a printing operation state before entering a line break operation. The line break handle 5 is stopped at its initial position in a state of being biased by a spring not illustrated. The guide rollers 10 are in contact with the print medium P and supported by bearings not illustrated which are provided in the lower unit case 14. Hence, the height to the printing apparatus 1 is determined by the guide rollers 10. The downstream position detection sensor 11 is constantly pressed in such a direction as to contact the print medium P, thereby being ready to measure the moving amount. The upstream position detection sensor 12 has retracted to a retracted position in conjunction with the line break mechanism drive gear train 51, thereby not being in contact with the print medium P. The line break legs 13 are in a standby state at their initial positions inside the printing apparatus 1, being not in contact with the print medium P.

Figure 4E:
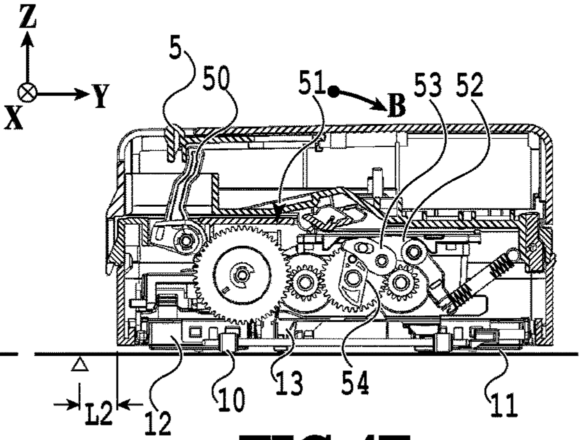
Figure 4B:
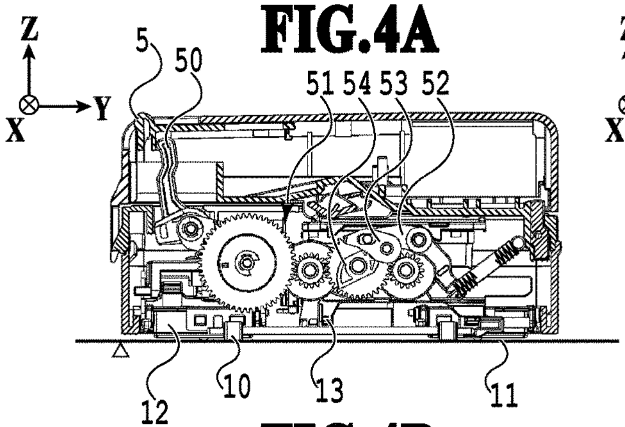
Figure 4F:
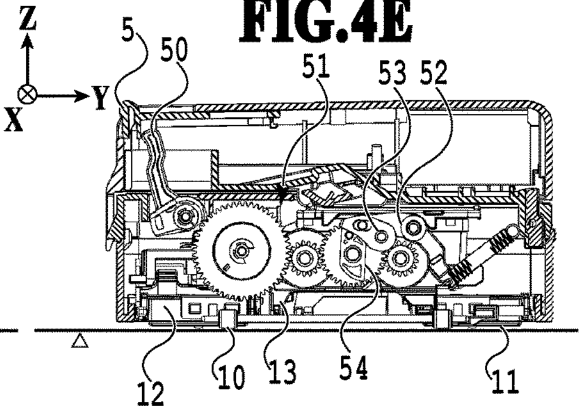
Figure 4C:
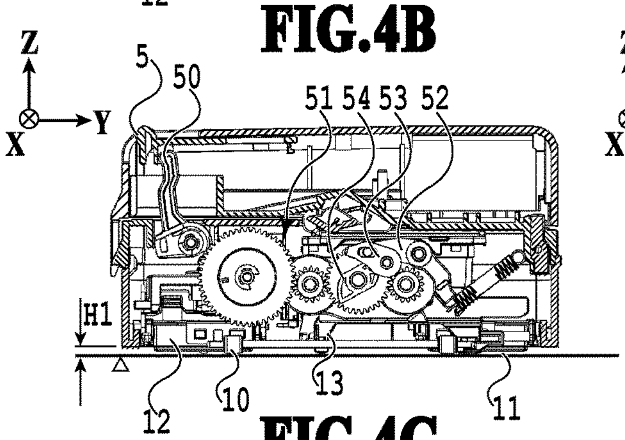

FIG. 4B illustrates a state where the operator starts pulling the line break handle 5 in the +Y direction in FIG. 4B, thereby starting a line break operation. In response to the start of the line break operation, firstly, a lock member (arm drive lever A 63 in FIG. 6A) which has retracted the upstream position detection sensor 12 moves in a −Z direction. As a result, the upstream position detection sensor 12 becomes movable in the ±Z directions (up-down direction), and also pressed by a pressing spring not illustrated in the −Z direction into contact with the print medium P. Thereafter, in FIG. 4C, the operator moves the line break handle 5 farther in the +Y direction. This causes the line break mechanism drive gear train 51 to act so as to move the line break legs 13 in the −Z direction into contact with the print medium P.

Figure 4G:
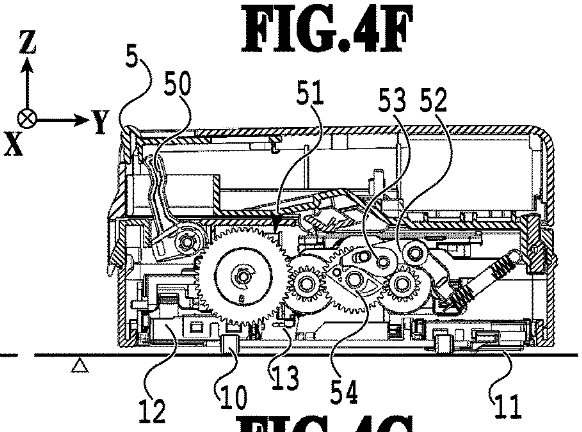
Figure 4D:
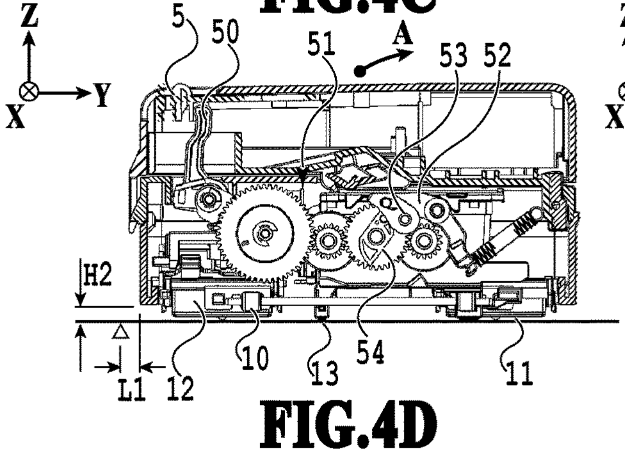

Next, in FIG. 4D, the line break handle 5 is moved farther in the +Y direction by the operator's operation. As a result, the line break legs 13 project farther than the guide rollers 10 in the −Z direction. This causes the printing apparatus 1 to start moving in the +Z direction. The line break legs 13 themselves make a transitional movement having a rotational locus inside the printing apparatus 1 in conjunction with gears of the line break mechanism drive gear train 51. Since the tips of the line break legs 13, which are made of a slip resistance material, are in contact with the print medium P, the body of the printing apparatus 1 conversely starts moving in the +Z direction with a transitional movement having a rotational locus.

Specifically, the body of the printing apparatus 1 moves in the direction of the arrow Ain FIG. 4D. FIG. 4D illustrates a state where the printing apparatus 1 has reached a half of the moving amount for the line break operation. This is a state where the printing apparatus 1 has moved a distance L1 in the moving direction for line break (+Y direction) from its position before the start of the line break (the white triangle mark in FIG. 4D). It can be observed that the height from the print medium P to the body of the printing apparatus 1 was H1 at the point of FIG. 4C but the height to the body of the printing apparatus 1 has increased to H2 in FIG. 4D. As the body of the printing apparatus 1 gets separated from the print medium P, the guide rollers 10 get separated from the print medium P as well. This enables the printing apparatus 1 to move forward in a direction other than the moving direction in the printing operation. As the line break mechanism drive gear train 51 further rotates from the state of FIG. 4D, the printing apparatus 1 starts moving in the −Z direction. During this time too, the upstream position detection sensor 12 keeps receiving a pressing force from the pressing spring. Thus, not only the downstream position detection sensor 11 but also the upstream position detection sensor 12 remains in contact with the print medium P.

Next, in FIG. 4E, the line break handle 5 is moved farther in the +Y direction by the operator's operation and reaches a predetermined position. As a result, the guide rollers 10 contact the print medium P, and the line break legs 13 are contained in the printing apparatus 1. With the guide rollers 10 contacting the print medium P, the guide rollers 10 act such that the printing apparatus 1 stops moving in the line break direction (+Y direction). The printing apparatus 1 has now completed moving a moving amount L2 determined in advance by the configuration of the line break mechanism drive gear train 51. Thereafter, in FIG. 4F, the line break handle 5 is returned to its initial position illustrated in FIG. 4A by the action of the spring not illustrated. Note that the above does not apply if the operator keeps holding the line break handle 5. Incidentally, the line break lever 50 and the line break mechanism drive gear train 51 are coupled via a one-way clutch not illustrated. Thus, the line break mechanism drive gear train 51 shifts to the next operation regardless of the position of the line break lever 50.

The drive gear train reset cam 54 on the line break mechanism drive gear train 51 is at such an angular phase as to receive a force from the drive gear train reset lever 52 and the drive gear train reset sub lever 53, which are spring-biased. Thus, due to the force from the drive gear train reset lever 52 and the drive gear train reset sub lever 53, the drive gear train reset cam 54 is subjected to a rotational force in the counterclockwise direction in FIGS. 4A to 4H. The line break mechanism drive gear train 51 keeps operating for as long as this rotational force acts on the drive gear train cam 54. Also, immediately after reaching the state of FIG. 4F, the lock member not illustrated in FIGS. 4A to 4H (the arm drive lever A 63 in FIG. 6A) rises, so that the upstream position detection sensor 12 starts moving in the +Z direction toward the retracted position.

Figure 4H:
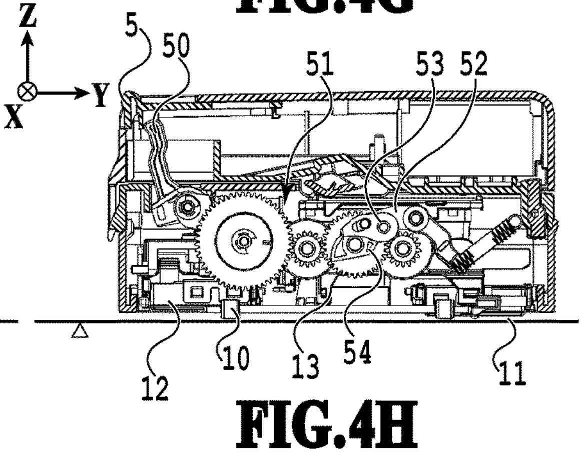

FIG. 4G illustrates a next state where the line break legs 13 have moved to the farthest position from the print medium P in the course of the resetting operation of the line break mechanism drive gear train 51. In this state, the upstream position detection sensor 12 has moved to the retracted position and is completely separated from the print medium P. FIG. 4H illustrates a subsequent state where the force from the drive gear train reset lever 52 and the drive gear train reset sub lever 53 no longer acts on the drive gear train reset cam 54 and the line break mechanism drive gear train 51 has stopped rotating, so that components have returned to their initial positions. Specifically, the upstream position detection sensor 12 and the line break legs 13 have returned to the same states as their states in FIG. 4A.

Line break is performed by such a series of operations. It can be observed that the printing apparatus 1 is actually moved in the period from FIG. 4C to FIG. 4E, as described above. In this period, the height from the print medium P to the body of the printing apparatus 1 increases from the height H1 to the height H2 but the downstream position detection sensor 11 and the upstream position detection sensor 12 remain in contact with the print medium P. Thus, during a line break operation, the moving amount of the printing apparatus 1 is detected by the two sensors, the downstream position detection sensor 11 and the upstream position detection sensor 12.

FIGS. 5A and 5B are views illustrating the downstream position detection sensor 11 and components around it. FIGS. 5A and 5B are cross-sectional views of the downstream position detection sensor 11 as seen from the position indicated by the line V-V of FIG. 4A. FIG. 5A illustrates a normal standby state and a printing operation state before the printing apparatus 1 enters a line break operation. The downstream position detection sensor 11 is constantly biased toward the print medium P. In the state of FIG. 5A, the downstream position detection sensor 11 and the print medium P are in contact with each other. The guide rollers 10 are also in contact with the print medium P. FIG. 5B is a cross-sectional view illustrating the operating state illustrated in FIG. 4D, which is a state in the middle of a line break operation. In FIGS. 5A and 5B, only the lower unit 2 is illustrated, and a cross section of the upper unit 3 is omitted.

The Y-direction sensor support shaft 11*d* is formed integrally with the downstream position detection sensor case 11*a* and extends in the Y direction. A downstream sensor case support arm 60 is rotatably engaged with the Y-direction sensor support shaft 11*d* and is rotatably supported as a link that rotates about a support arm shaft 61 fixed to the lower unit case 14. In the state of FIG. 5A, the guide rollers 10 are in contact with the print medium P and at the same time the downstream position detection sensor 11 is in contact with the print medium P, as mentioned above. The downstream position detection sensor 11 is brought into contact with the print medium P as a result of the downstream sensor case support arm 60 being biased by a spring not illustrated with a moment in the clockwise direction in FIG. 6A about the support arm shaft 61.

The downstream sensor case support arm 60 presses the Y-direction sensor support shaft 11*d* in the −Z direction, and the two sensor case sliders 11*b*, which are disposed bilaterally symmetrically about the Y-direction sensor support shaft 11*d*, are brought into contact with the print medium P. As a result, the downstream position detection sensor case 11*a* is equalized along the print medium P and brought into stable contact with it. For the sensor case sliders 11*b*, it is preferable to use a material with a low coefficient of friction with the print medium P. Doing so can reduce the sliding friction between the print medium P and the sensor case sliders 11*b* during printing operations and line break operations.

Also, the bearing portion of the support arm shaft 61 and the downstream sensor case support arm 60 and the bearing portion of the downstream sensor case support arm 60 and the Y-direction sensor support shaft 11*d* are each preferably configured with as small play as possible. Configurations with small play can prevent a change in the relative positions of the lower unit case 14 and the downstream position detection sensor case 11*a* and vibration of the downstream position detection sensor case 11*a* when the sensor case sliders 11*b* receive a frictional force. Moreover, the downstream position detection sensor case 11*a* and the downstream sensor case support arm 60 have a spring installed on one side of a support portion of the downstream position detection sensor case 11*a* so as to bias the downstream position detection sensor case 11*a* in one of the ±Y directions. This configuration can prevent a change in the relative position of the downstream position detection sensor case 11*a* in the line break direction and vibration of the downstream position detection sensor case 11*a*.

Owing to such a support configuration of the downstream position detection sensor 11, the downstream position detection sensor case 11*a* is stably pressed against the print medium P. Accordingly, the distance between the sensor lens 11*c* and the downstream position detection sensor 11, which are fixed inside the downstream position detection sensor case 11*a*, and the print medium P can be maintained constant. Moreover, the distance between the downstream position detection sensor 11 and the print medium P can be accurately maintained since the accuracy of the distance is determined by the dimensional accuracy of a single component, the downstream position detection sensor case 11*a*.

The downstream position detection sensor case 11*a* is usually a part produced by resin molding with a mold. Accordingly, the part's dimensional reproducibility is high. This makes it possible to significantly reduce variation between products. Further, as illustrated in FIG. 1B, the sensor case sliders 11*b* are positioned very close to the sensor lens 11*c*. Thus, even if the print medium P is deformed, the sensor case sliders 11*b* hold down the deformed portion. Hence, the downstream position detection sensor 11 is hardly affected by the deformation of the print medium P and can stably detect the moving amount.

During a line break operation, as illustrated in FIG. 5B, the line break legs 13 project from a lower portion of the lower unit case 14 and come into contact with the print medium P, so that the body of the printing apparatus 1 moves in the +Z direction. At this time, the downstream sensor case support arm 60, which is biased in the −Z direction by the spring not illustrated, rotates clockwise and keeps biasing the downstream position detection sensor case 11*a* toward the print medium P. This makes it possible to continue detecting the moving amount of the printing apparatus 1 even during the line break operation.

In the present embodiment, the movement of the downstream position detection sensor 11 involves a rotational movement via a swinging movement of the downstream sensor case support arm 60. This means that the downstream position detection sensor 11 is slightly displaced in the ±X directions as viewed from the lower unit case 14. Nonetheless, the slight displacement in the ±X directions is not problematic since it is only necessary to compare the position in the Y direction in the state of FIG. 4C and that in the state of FIG. 4E in order to determine the moving distances and moving directions before and after a line break operation.

The configuration of the downstream position detection sensor 11 described above is the same as the upstream position detection sensor 12. Thus, the above statement also applies to the upstream position detection sensor 12.

Next, a reason for retracting the upstream position detection sensor 12 to separate it from the print medium P during periods other than while line break operations are performed in the present embodiment will be described. As has been described above, detecting the position of the printing apparatus 1 requires the sensor case sliders 11*b* and 12*b* (see FIG. 1B) and the print medium P to be rubbed against each other. As can be analogized from the explanatory views of FIGS. 2C and 2D, if the upstream position detection sensor 12 is brought into contact with the print medium P during the printing of the second line in FIG. 2D or of a subsequent line, the sensor case sliders 12*b* get rubbed on the printed area PA. If there is an ink yet to be fixed in the rubbed region, the sensor case sliders 12*b* spread this ink over the print medium P, which results in unintended soiling. This deteriorates the image quality and must be avoided.

For this reason, in the present embodiment, the upstream position detection sensor 12 is separated from the print medium P during printing operations. During line break operations, which are performed outside the printed area PA, rubbing the upstream position detection sensor 12 does not cause soiling. The upstream position detection sensor 12 is therefore brought into contact with the print medium P, and the position of the printing apparatus 1 is detected with the two sensors, the downstream position detection sensor 11 and the upstream position detection sensor 12. This enables accurate measurement of the moving amount of the printing apparatus 1.

Figure 6C:
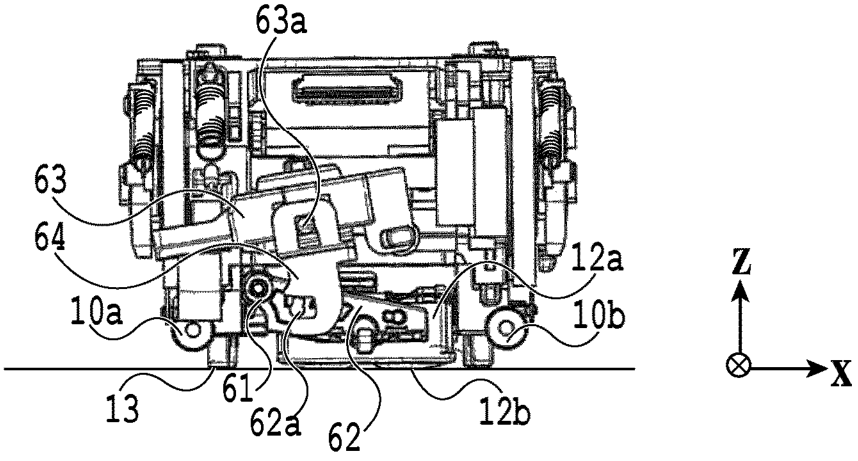

FIGS. 6A to 6C are views illustrating the upstream position detection sensor 12 and components around it. FIGS. 6A to 6C are views of the upstream position detection sensor 12 as seen from the position indicated by the line VI-VI of FIG. 4A. FIG. 6A illustrates a normal standby state and a printing operation state before the printing apparatus 1 enters a line break operation. The upstream position detection sensor 12 in the present embodiment is configured to be movable relative to the guide rollers 10 in the ±Z directions, like the downstream position detection sensor 11.

The upstream position detection sensor 12 is configured to be capable of being moved by a moving mechanism between the retracted position and the contact position in conjunction with the line break mechanism drive gear train 51. The moving mechanism includes an upstream sensor case support arm 62, the arm drive lever A 63, and an arm drive lever B 64. Like the downstream sensor case support arm 60 (see FIGS. 5A and 5B), the upstream sensor case support arm 62 supports the upstream position detection sensor case 12*a*. The arm drive lever A 63 is used to drive the upstream sensor case support arm 62. The arm drive lever B 64 is a member linking the arm drive lever A 63 and the upstream sensor case support arm 62.

In the state of FIG. 6A, the upstream position detection sensor 12 has retracted to the retracted position in conjunction with the line break mechanism drive gear train 51 and is not in contact with the print medium P. The upstream position detection sensor 12 is basically configured to be moved in the ±Z directions by the moving mechanism in conjunction with the line break mechanism drive gear train 51. The upstream position detection sensor 12 is brought into contact with the print medium P only during line break operations. During other periods, the upstream position detection sensor 12 is separated from the print medium P and retracted to the retracted position inside the body of the printing apparatus 1.

During printing operations, during which the upstream position detection sensor 12 is located at the retracted position, and in a state immediately before starting a line break operation (the state of FIG. 6A), a spring not illustrated acts on the arm drive lever A 63 such that the arm drive lever A 63 is biased in the +Z direction and brought into contact with and stopped by a stopper not illustrated. The arm drive lever A 63 includes a protrusion 63*a*. The arm drive lever A 63 is engaged with the upstream sensor case support arm 62 via the arm drive lever B 64 fitted to the protrusion 63*a* through a hole therein. The upstream sensor case support arm 62 includes a support arm protrusion 62*a*, which is pulled up in the +Z direction by the arm drive lever B 64, thereby retracting the upstream position detection sensor 12 to the retracted position inside the printing apparatus 1.

As the line break handle 5 is moved by the operator's operation and a line break operation starts, the cam on the line break mechanism drive gear train 51 acts so as to press the arm drive lever A 63 such that the state of FIG. 6B is reached from the state of FIG. 6A. Specifically, the protrusion 63*a* of the arm drive lever A 63 moves in the −Z direction, so that the arm drive lever B 64 moves in the −Z direction as well. This releases the support arm protrusion 62*a* from a constrained state, so that the upstream sensor case support arm 62 rotates about the support arm shaft 61 in the clockwise direction in FIGS. 6A to 6C. Thus, the upstream position detection sensor 12 also contacts the print medium P, as illustrated in FIG. 6B. The protrusion 63*a* of the arm drive lever A 63 and the hole of the arm drive lever B 64 are fitted to each other with a large backlash therebetween. Accordingly, in the state where the arm drive lever A 63 is lowered, the upstream position detection sensor 12 is freely movable in the up-down direction within a predetermined range. The movement in this state is similar to that of the downstream position detection sensor 11 described with reference to FIGS. 5A and 5B. FIG. 6C is a view of a state corresponding to FIG. 4D. The rollers 10*a* and 10*b* have been separated from the print medium P but the upstream position detection sensor 12 remains in contact with the print medium P.

Next, an example of preventing widening of a non-printable margin area in the present embodiment will be described. As illustrated in FIGS. 1A and 1B, the printing apparatus 1 in the present embodiment has a certain width. Also, the print head 4 is disposed around the center of the printing apparatus 1 in the width direction (±X directions). In this case, a printed area immediately after being printed is hidden by the body of the printing apparatus and is thus not visible. In order to visually confirm the completion of an operation of printing a single line, the operator needs to continue scanning the printing apparatus 1 farther even after the printing is finished (scan involving no printing).

Here, assume that the print medium P is a wide and uniform medium and a printing operation is to be performed on a part of its region. In this case, it is not particularly problematic to continue scanning the printing apparatus 1 farther after the printing is finished (scan involving no printing). However, in a case where the print medium P is, for example, a piece of notepaper or the like with a limited printable surface area, a problem as below occurs. The printing apparatus 1 in the present embodiment is configured to be movable on the print medium P only within a range within which the guide rollers 10 are in contact with the print medium P. For this reason, in the case of performing a printing operation on a print medium P such for example as a piece of notepaper with a limited printable surface area, it is necessary to finish the printing operation at a position inward of an end of the notepaper by a predetermined distance. Moreover, after finishing the printing operation, it is necessary to continue scanning the printing apparatus 1 farther and see the entire printed area to confirm the completion of the printing operation. This leads to a problem of widening the non-printable margin area by a non-printing scan distance longer than the above predetermined distance from the end of the notepaper.

In the present embodiment, when the printing apparatus 1 is moved to a position from which a line break operation can be performed after finishing a scan for printing, the user is notified that a line break operation can be performed. This can prevent the increase of the non-printable margin area.

As described earlier, in the present embodiment, during line break operations, the upstream position detection sensor 12 contacts the print medium P, and the upstream position detection sensor 12 and the downstream position detection sensor 11 both perform detection. During printing operations, the upstream position detection sensor 12 is in a separated state. Thus, moving the printing apparatus 1 to a position from which a line break operation can be performed after finishing a scan for printing is equivalent to moving the printing apparatus 1 to a position where the upstream position detection sensor 12 will not be rubbed against the printed area of the print medium P during the line break operation.

Figure 7A:
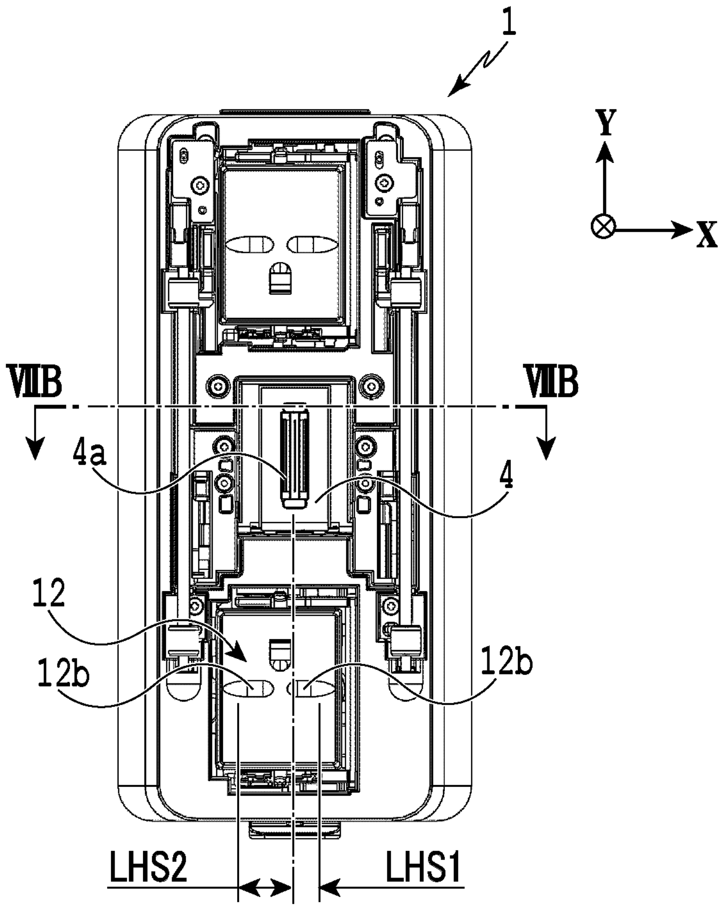
FIGS. 7A and 7B are views describing a positional relationship between a nozzle unit and sensor case sliders.
Figure 7B:
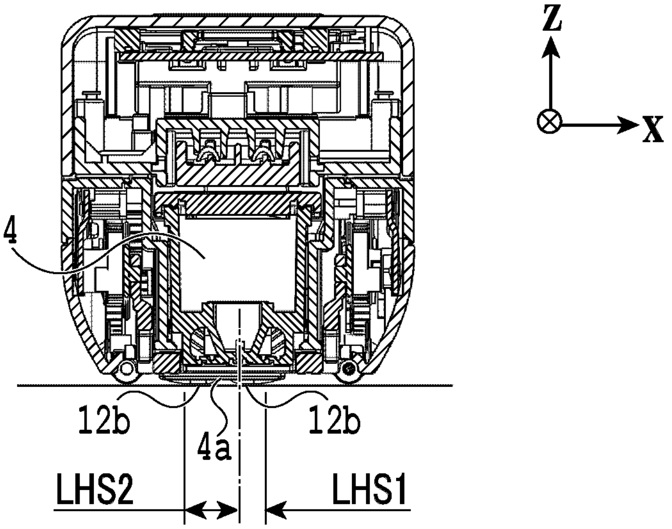

FIGS. 7A and 7B are views describing a positional relationship between a nozzle unit of the print head 4 and the sensor case sliders 12*b* of the upstream position detection sensor 12. As mentioned earlier, the sensor case sliders 12*b* are portions of the upstream position detection sensor 12 that get rubbed against the print medium P. FIG. 7A is a view of the printing apparatus 1 as seen from its bottom surface. The print head 4 is disposed substantially at the center of the bottom surface of the printing apparatus 1, and a nozzle unit 4*a* being a plurality of minute nozzles arranged in a line is provided substantially at the center of the apparatus in the ±X directions. The sensor case sliders 12*b* of the upstream position detection sensor 12 are disposed to be slightly offset from the center due to the arrangement of the upstream sensor case support arm 62 and the like.

FIG. 7B is a cross-sectional view as seen from the portion indicated by the arrows VIIb-VIIb of FIG. 7A. Also, the line break mechanism is in the state illustrated in FIG. 4B, in which the upstream position detection sensor 12 has come into contact with the print medium P after the start of a line break operation. Looking at the states of contact of the sensor case sliders 12*b* with the print medium P in FIG. 7B, it can be understood that the distance from the nozzle unit 4*a* to the contact portion in the +X direction is LHS1, and the distance to the contact portion in the opposite −X direction is LHS2, where LHS1<LHS2.

FIGS. 8A to 8E are diagrams describing positions at which to perform line break operations and the operations of the upstream position detection sensor 12, the downstream position detection sensor 11, and the LED 15 in these line break operations. The LED 15 is a notification unit configured to notify the operator that printing of a single line is finished. FIGS. 8A to 8E are diagrams schematically illustrating a positional relationship between the printing apparatus 1 and a printed area PA of the print medium P, like FIGS. 2A to 2D, as well as the operating states of the sensors and the LED 15. In FIGS. 8A to 8E, each black rectangle represents a state where the upstream position detection sensor 12 or the downstream position detection sensor 11 is in contact with the print medium P, while each white rectangle represents a state where the upstream position detection sensor 12 or the downstream position detection sensor 11 is not in contact with the print medium P.

Figure 8A:
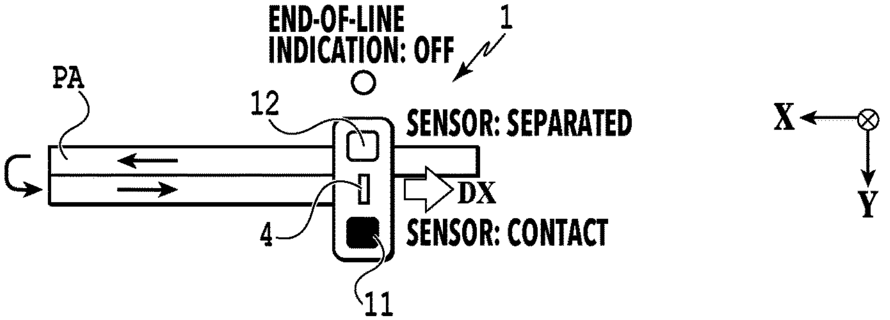
FIGS. 8A to 8E are diagrams describing an upstream position detecting operation and an LED's operation.

FIG. 8A illustrates a state where a line break operation has been performed after an operation of printing the first line from the right side of FIG. 8A (−X direction) to its left side (+X direction), and an operation of printing the second line is being performed from the left side (+X direction) toward the right side (−X direction). In this state, the downstream position detection sensor 11 is in contact with the print medium P while the upstream position detection sensor 12 is not in contact with the print medium P, and the LED 15 is turned off.

Figure 8B:
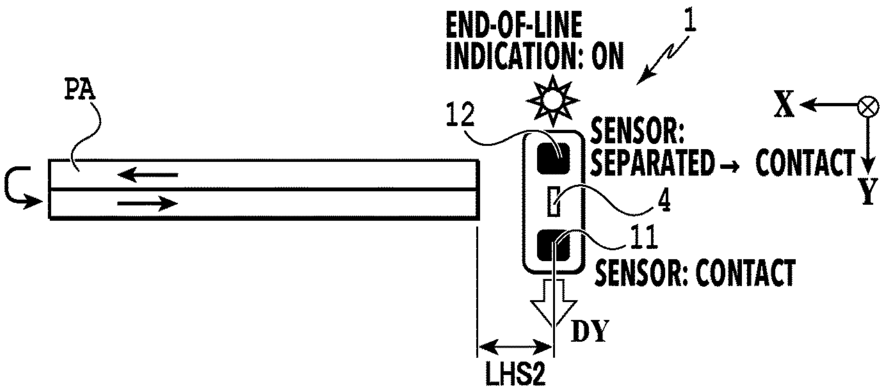

FIG. 8B illustrates a state where the printing operation of the second line has been finished, and a line break operation has started. Basically, the line break operation is performed from a position separated from the printed area PA. Specifically, after completing the printing of the second line, the operator continues moving the printing apparatus 1 farther and performs the line break operation from a position separated from the printed area PA. In the present embodiment, the printing apparatus 1 turns on the LED 15 to notify the operator of a position from which to perform that line break operation. That is, the LED 15 makes a notification indicating the end of a printing operation of a single line, but does not make this notification at a timing immediately after the end of the actual printing operation of the single line. In the present embodiment, the notification is made at a timing after the end of an actual printing operation of a single line at which the printing apparatus 1 reaches a position where the operator's operation will not affect the printing quality.

Here, assume that the printing apparatus 1 stops being moved exactly at a position where ink ejection from the print head 4 is finished, and a line break operation is then performed. In this case, the upstream position detection sensor 12 contacts the print medium P, so that the sensor case sliders 12*b* get rubbed against the printed area PA. As a result, the sensor case sliders 12*b* may scrape an ink yet to be fixed. In order to avoid such a phenomenon, it is necessary to continue the scan to a position from which the sensor case sliders 12*b* will not get rubbed against the printed area PA, instead of performing the line break operation from the position immediately after finishing the printing. The distance of this continued scan is the non-printing scan distance LHS2 mentioned earlier.

In a case of performing a line break operation on the right side (−X side) of the printed area PA as illustrated in FIG. 8B, failing to leave this distance LHS2 as illustrated in FIG. 7B or a longer distance will result in the printed area PA and the corresponding sensor case slider 12*b* overlapping each other during the line break operation. Hence, in a case where the operator scans the printing apparatus 1 in the direction of the arrow DX (−X direction), the LED 15 is turned on when the printing apparatus 1 is scanned farther by the non-printing scan distance LHS2 after finishing the single-line printing operation. By turning on the LED 15, the operator is notified of the timing to finish the scan. In response to the LED 15 being turned on, the operator stops the scan and then operates the line break handle 5 to perform a line break operation. FIG. 8B illustrates a state immediately after the printing apparatus 1 starts performing the line break operation. In this state, the downstream position detection sensor 11 and the upstream position detection sensor 12 are both in contact with the print medium P.

Figure 8C:
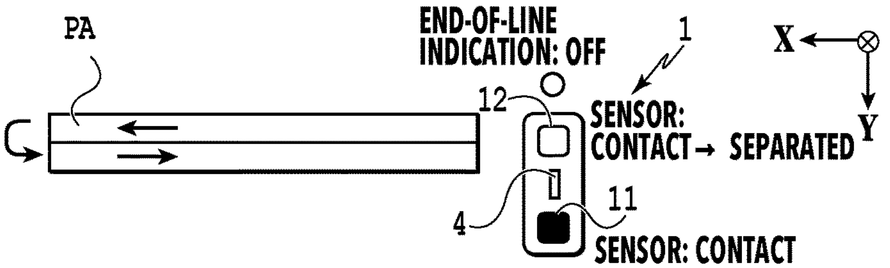

FIG. 8C illustrates a state where the line break operation has been finished. In this state, the downstream position detection sensor 11 is in contact with the print medium P while the upstream position detection sensor 12 is not in contact with the print medium P, and the LED 15 is turned off. In the present embodiment, the LED 15 is turned off in response to reaching a state where the line break operation is completed, i.e., the state of FIG. 4H. Whether the line break operation is completed is determined based on the result of the detection by the line break leg sensor 208 (see FIG. 3). In this example, the LED 15 is turned off in the state where the line break operation is completed. However, the LED 15 may be turned off at the point when the line break operation is started.

Figure 8D:
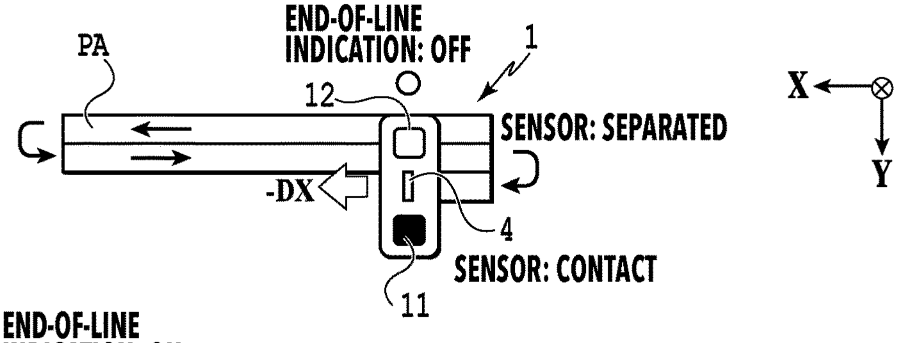

FIG. 8D illustrates a state where an operation of printing the third line is being performed from the right side toward the left side. In this state, the downstream position detection sensor 11 is in contact with the print medium P while the upstream position detection sensor 12 is not in contact with the print medium P, and the LED 15 is turned off. Since the upstream position detection sensor 12 is not in contact with the print medium P, the upstream position detection sensor 12 is not rubbed on the printed area PA during the printing operation.

Figure 8E:
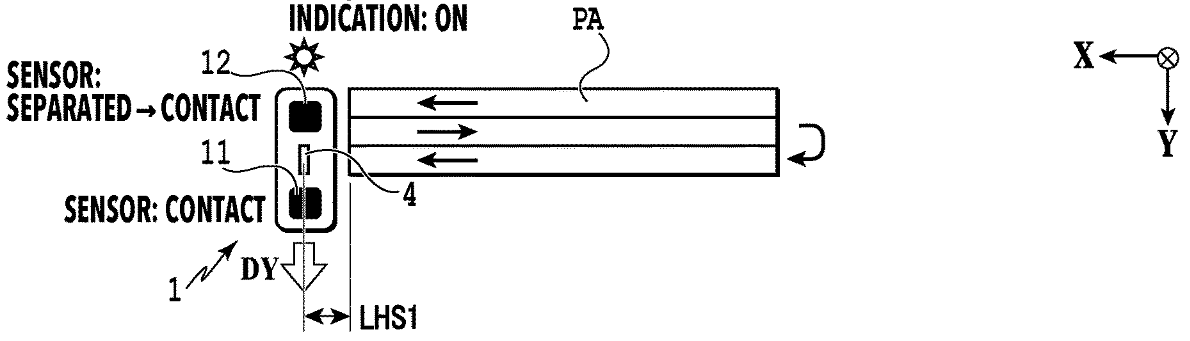

FIG. 8E illustrates a state where the printing operation of the third line has been finished and a line break operation is started for the printing operation of the fourth line. At this time, the distance LHS1 illustrated in FIG. 7B is the non-printing scan distance, and the LED 15 is turned on when the printing apparatus 1 is scanned by the non-printing scan distance LHS1 after finishing the single-line printing operation. That is, in the present embodiment, the distance for turning on the LED 15 after finishing a printing operation is varied depending on the scanning direction. The scanning direction in the present embodiment includes a forward direction and a backward direction, and the distance between the nozzle unit 4*a* and the sensor case slider 12*b* in the forward direction and the distance between the nozzle unit 4*a* and the sensor case slider 12*b* in the backward direction are different. Thus, the configuration is such that the non-printing scan distance for turning on the LED 15 is changed according to the positional relationship between the nozzle unit 4*a* and the sensor case sliders 12*b* and the scanning direction of the printing apparatus 1. Also, the upstream position detection sensor 12 is the sensor with which the non-printing scan distance is defined. This is because it is the upstream position detection sensor 12 whose sensor case sliders have a possibility of being rubbed against a printed area, as mentioned earlier.

As has been described above, the upstream position detection sensor 12 switches back and forth between a contact state and a non-contact state. Hence, a trigger for determining the timing to start a position detecting operation is needed. For this reason, in the present embodiment, the line break leg sensor 208 is used. The line break leg sensor 208 is a sensor that detects the position of the line break legs 13. In the present embodiment, the upstream position detection sensor 12 is displaced in conjunction with the line break legs 13. Thus, by using the line break leg sensor 208, it is possible to detect whether the upstream position detection sensor 12 is in the raised position or the lowered position. The upstream position detection sensor 12 is caused to start a reading operation in a case where the line break leg sensor 208 detects that the upstream position detection sensor 12 is lowered, and is caused to finish the reading operation in a case where the line break leg sensor 208 detects that the upstream position detection sensor 12 is raised.

Note that in the example described in the present embodiment, the notification unit is implemented by turning on and off the LED 15, but is not limited to this example. For instance, the LED 15 may be flashed or the color in which the LED 15 is flashed or turned on may be changed. Moreover, the notification unit does not have to be visually notifying means like the LED 15. A notification may be made by auditorial means such as a buzzer. Alternatively, a notification by tactual means such as vibration may be used. Moreover, these means may be used in combination.

Also, in the example of the present embodiment, after printing of a single line is finished, the LED 15 is kept turned on in a period from the notification prompting the operator to stop the scan until the end of a line break operation. However, the present embodiment is not limited to this example. Different methods may be used to make a notification prompting the operator to stop the scan and a notification prompting the operator to start the line break operation. This makes the notifications easier to understand and therefore improves the operability. For example, in the case of using visual means, an LED capable of displaying two colors can be used such that the LED is turned on in a first color to prompt the operator to stop the scan and, in response to the operator stopping the scan, the lighting is changed to a second color to prompt the operator to start the line break operation. In this case, the lighting in the second color is stopped or turned off when the line break operation is finished. Further, when the printing operation of the last line, after which there will be no printing of a next line, is finished, the notification may be changed to another fashion such as flashing the LED 15. This makes the notification even easier to understand.

Note that, as mentioned earlier, the moving amount of the printing apparatus 1 performing a printing operation of a single line is detected by the downstream position detection sensor 11 and sent to the control unit 16. The control unit 16 is capable of specifying the timing to finish the printing based on print data. The control unit 16 therefore performs control to turn on the LED 15 based on the print data and the moving amount detected by the downstream position detection sensor 11. The control unit 16 also performs control to turn off the LED according to the result of the detection by the line break leg sensor 208.

Figure 9A:
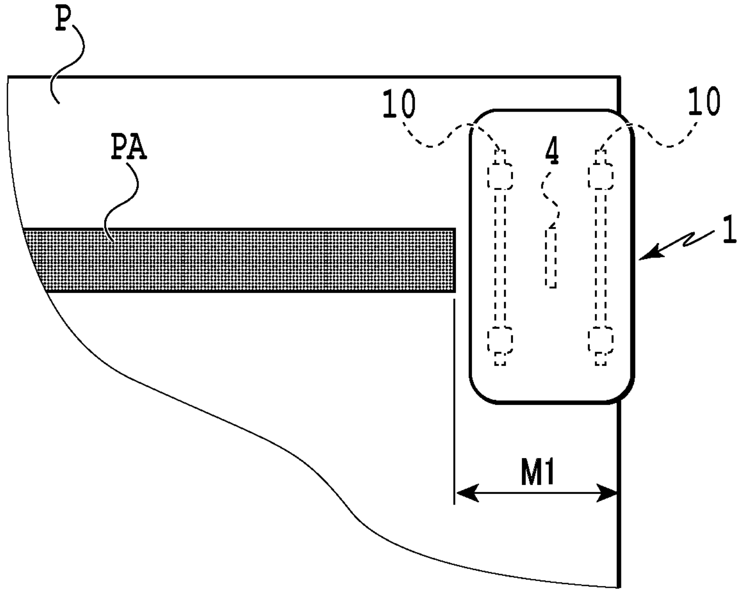
FIGS. 9A and 9B are views illustrating print margin ranges.
Figure 9B:
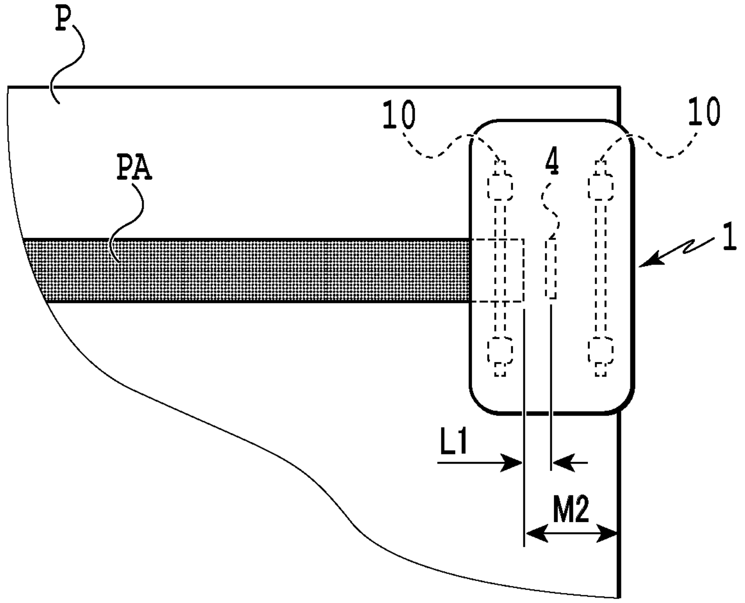

FIGS. 9A and 9B are views illustrating a print margin range according to the present embodiment and a print margin range according to a comparative example. The difference between a print margin range in a case where the operator visually determines whether printing of a single line is finished, which represents the comparative example, and a print margin range on the print medium P in the present embodiment will be described using FIGS. 9A and 9B.

FIG. 9A illustrates the margin distance in the case where the operator visually determines whether printing of a single line is finished, which represents the comparative example. In the printing apparatus 1, the nozzle unit 4*a*, which ejects the ink in the print head 4, is disposed at the center of the width of the apparatus in the scanning direction. Hence, a portion immediately after the end of the printing operation is hidden by the body of the apparatus, and the operator cannot see the portion immediately after the end of the printing operation. Therefore, after the end of the printing operation, it is necessary to continue scanning the printing apparatus 1 to such a position that the operator can see the end of the printed area PA. Here, in the case where the print medium P is a piece of notepaper or the like, it will be difficult to print the next line if the guide rollers 10 are moved to the outside of the print medium P, which is what is called a run-off state. The printing apparatus 1 must therefore be stopped within such a range that the guide rollers 10 are on the print medium P. Thus, it is necessary to ensure that the margin as viewed from the right side of the print medium P has a margin distance M1 in FIG. 9A.

FIG. 9B is a view illustrating the print margin range in the present embodiment. In the present embodiment, the determination of where to stop the scan does not rely on the operator's visual check. Thus, the operator only needs to stop the scan by following a notification from the notification unit at a position reached by scanning the printing apparatus 1 farther by a non-printing scan distance L1 (LHS1 or LHS2) after finishing the printing of a single line. That is, there will be no problem even if the end of the printed area PA is hidden by the printing apparatus 1 and not visible. Accordingly, the margin as viewed from the right side of the print medium P can be narrowed to a margin distance M2 in FIG. 9B.

As described above, according to the present embodiment, the operator can confirm the completion of an operation of printing a single line without seeing the printed area. This eliminates the need for the operator to visually check the printed area for each scan, and therefore improves the operability. Also, the printing apparatus 1 does not need to be scanned over a more-than-necessary distance. Thus, in the case of a print medium such as a piece of notepaper on which the range of movement of the printing apparatus is limited, it is possible to widen the range within which a printing operation can be performed without the scan guide units such as the guide rollers running off the region of the print medium. Accordingly, the non-printable margin area can be narrowed.

Second Embodiment

In the first embodiment, an example has been described in which a notification is made by the LED 15 at a position reached by scanning the printing apparatus 1 farther by the non-printing scan distance L1 (LHS1 or LHS2), after which the upstream position detection sensor 12 will not get rubbed against the printed area PA, after the end of a single-line printing operation. In the present embodiment, an example will be described in which the non-printing scan distance is extended farther according to the print data of the next line after a line break. Note that the basic configuration is similar to the example described in the first embodiment, and the difference will therefore be described below.

Figure 10:
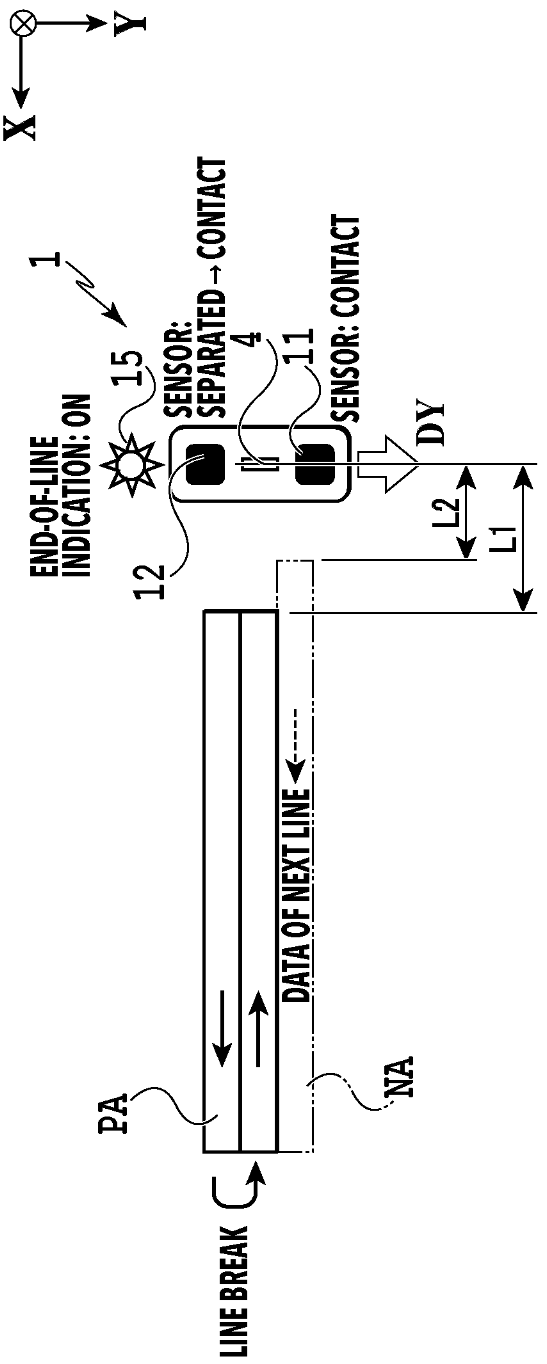
FIG. 10 is a diagram describing an upstream position detecting operation and an LED's operation.

FIG. 10 is a diagram describing an upstream position detecting operation and the LED's operation. FIG. 10 is a schematic diagram illustrating a state corresponding to FIG. 8B in a case where the print data of a next line is longer than the printed area PA. In the case where the print data of the next line is longer than the printed area PA, it is necessary to move the printing apparatus 1 to a position separated additionally by a non-printing scan distance L2 from the end of an area NA for printing the next line. This is because it is necessary to provide a run-up distance to be taken before the scanning speed stabilizes from the stop position in the scan in the +X direction for the next line. Thus, in this case, the distance to a position reached by adding the non-printing scan distance L2 to the area NA for printing the next line after the end of the current printing operation is the non-printing scan distance L1 for the scan for the current line. As described above, in the present embodiment, the configuration is such that the non-printing scan distance L1 is changed according to the data of the next line to be printed after a movement in the moving direction for line break.

In this way, even in the case where the print data of the next line is longer than the printed area PA, it is possible to print the data without missing any part of it while also avoiding soiling due to contact between the upstream position detection sensor 12 and the print medium P.

Third Embodiment

In the first embodiment, an example has been described in which a notification unit is provided to the body of the printing apparatus 1. In the present embodiment, an example will be described in which a notification unit is provided outside the printing apparatus 1. Specifically, in the present embodiment, the control unit 16 in the printing apparatus 1 is configured to externally notify of the current position of the printing apparatus 1 and, according to this notification, an external host apparatus makes a predetermined notification. Note that the basic configuration is similar to the example described in the first embodiment, and the difference will therefore be described below.

Figure 11A:
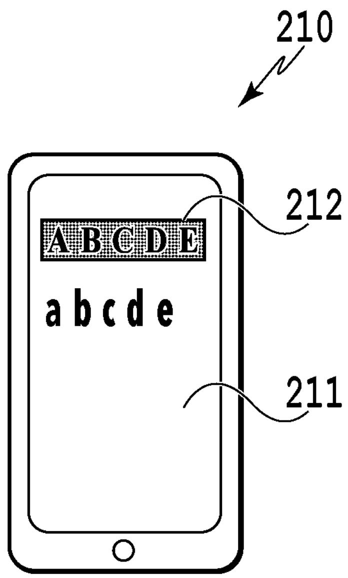
FIGS. 11A and 11B are schematic views illustrating a configuration in which an external host is provided with a notification unit.
Figure 11B:
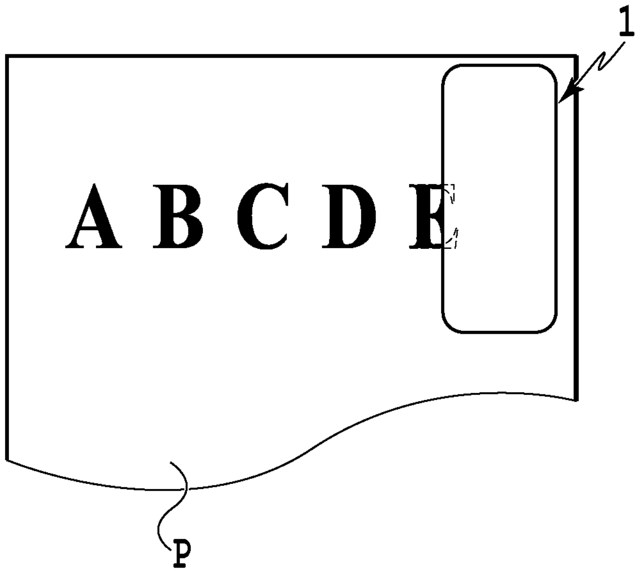

FIGS. 11A and 11B are schematic views illustrating a configuration in which an external host such as a smart device capable of communicating with the printing apparatus 1 is provided with a notification unit. In FIG. 11A, an external host 210 is an apparatus such as a smart device that sends print data. The external host 210 includes a display 211. On the display 211, for example, a background color is applied to a printed portion to display a printing completion indication 212 as a notification to the operator.

FIG. 11B illustrates a state of printing on the print medium P. The control unit 16 in the printing apparatus 1 communicates with the external host 210 via the wireless interface 206 to send the current position of the printing apparatus 1 to the external host 210. The external host 210 is configured to reflect this information on the current position to update the printing completion indication 212 in real time. Then, in response to determining that the printing apparatus 1 has reached a scan stop position, the external host 210 notifies the operator of this fact by visual means such as changing the color of the printing completion indication 212 or flashing the background color portion. Note that, as with the example described in the first embodiment, the notification unit may be auditorial means such as a buzzer or audio speaker of the external host 210 or tactual means such as vibration of the external host 210. Moreover, these may be used in combination. Furthermore, the external host 210 and the printing apparatus 1 may both be provided with respective notification units.

As described above, by providing the external host 210 with a notification unit, it is possible to use a variety of notification means supported by the specifications of the external host 210. This facilitates the operator's recognition and improves the operability.

Other Embodiments

The above embodiments can be combined as appropriate. For example, in a configuration in which the non-printing scan distance is extended as described in the second embodiment, a notification unit may be provided outside the printing apparatus 1 as described in the third embodiment.

In the above embodiments, an example has been described in which, in a line break operation, the user presses down the line break handle 5 in the moving direction for line break to thereby cause the line break lever 50 to operate in conjunction with the line break handle 5, and the line break mechanism drive gear train 51 is driven according to the operation of the line break lever 50 to thereby cause the line break legs 13 to operate. However, the line break operation is not limited to this example. For instance, a motor, a solenoid, or the like that drives a chain of drives may be used as an actuator. Moreover, the line break handle 5 may be replaced with a line break button or the like that drives the actuator.

Also, the upstream position detection sensor 12 and the line break mechanism may be configured as separate components from the body of the printing apparatus 1. Specifically, in a use situation that requires accuracy during a line break movement, a line break device including the upstream position detection sensor 12 and the line break mechanism may be mounted to the body, and an operation as described in the above embodiments may be performed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-125322, filed Jul. 30, 2021, which is hereby incorporated by reference herein in its entirety.

What is claimed is:

1. A printing apparatus comprising:

a guide unit configured to guide movement, in a first direction, of the printing apparatus held and moved by a user;

a printing unit configured to print an image onto a print medium with the movement in the first direction;

a second guide unit configured to guide movement of the printing apparatus in a second direction crossing the first direction;

a detection unit configured to detect a relative moving amount between the printing apparatus and the print medium; and a control unit configured to cause a notification unit to make a predetermined notification in a case where the printing apparatus reaches a position, wherein the printing apparatus reaches the position by moving a first distance in the first direction from a position at which the printing operation by the printing unit is completed.

2. The printing apparatus according to claim 1, wherein the first direction includes a forward direction and a backward direction, and wherein the first distance is different in the forward direction and in the backward direction.

3. The printing apparatus according to claim 1, wherein the first distance varies according to data to be printed after the printing apparatus is moved in the second direction.

4. The printing apparatus according to claim 1, wherein the first distance is a distance to a position which is a second distance away in the first direction from a position from which the printing apparatus is to start printing after being moved in the second direction.

5. The printing apparatus according to claim 1, wherein the notification unit is included in the printing apparatus.

6. The printing apparatus according to claim 1, wherein the notification unit is included in a host apparatus capable of communicating with the printing apparatus.

7. The printing apparatus according to claim 1, wherein the detection unit includes a first detection unit with which the first distance is defined, and a second detection unit which is different from the first detection unit, and wherein the first detection unit is provided on an opposite side of a moving direction in the second direction relative to the printing unit in the second direction.

8. The printing apparatus according to claim 7, wherein the first detection unit is in contact with the print medium in a case where the printing apparatus is moved in the second direction, and is separated from the print medium in a case where the printing apparatus is moved in the first direction.

9. The printing apparatus according to claim 7, wherein the second detection unit detects the relative moving amount in the movement of the printing apparatus in the first direction, and wherein the control unit causes the notification unit to make the predetermined notification by using a result of the detection by the second detection unit.

* * * * *